(12) United States Patent
Deng et al.

(10) Patent No.: US 11,801,756 B2
(45) Date of Patent: Oct. 31, 2023

(54) PERMANENT MAGNET ELECTRODYNAMIC SUSPENSION SYSTEM AND GUIDANCE METHOD THEREFOR

(71) Applicant: Southwest Jiaotong University, Chengdu (CN)

(72) Inventors: Zigang Deng, Chengdu (CN); Hongfu Shi, Chengdu (CN); Yuqing Xiang, Chengdu (CN); Ting Cao, Chengdu (CN); Hao Lu, Chengdu (CN); Junzhi Liu, Chengdu (CN); Le Liang, Chengdu (CN); Jun Zheng, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/179,982

(22) Filed: Mar. 7, 2023

(65) Prior Publication Data

US 2023/0241980 A1  Aug. 3, 2023

(30) Foreign Application Priority Data

Jun. 13, 2022 (CN) .......................... 202210659353.7

(51) Int. Cl.
*B60L 13/04* (2006.01)

(52) U.S. Cl.
CPC .......... *B60L 13/04* (2013.01); *B60L 2200/26* (2013.01)

(58) Field of Classification Search
CPC .......... B60L 13/04; B60L 13/06; B60L 13/08; B60L 15/00; B60L 15/002; B60L 15/005; B60L 2200/26
See application file for complete search history.

(56) References Cited

U.S. PATENT DOCUMENTS

2003/0005851 A1  1/2003  Post
2006/0016365 A1  1/2006  Baldi et al.
(Continued)

FOREIGN PATENT DOCUMENTS

CN  1339370 A  3/2002
CN  101314329 A  12/2008
(Continued)

OTHER PUBLICATIONS

Shangjun Wan et al., Study of The Levitation and Guidance Technology for Electrodynamic Suspension Maglev Vehicle, Proceedings of the CSEE, 2000, vol. 20, No. 9, pp. 22-25,31.
(Continued)

*Primary Examiner* — Robert J McCarry, Jr.

(57) ABSTRACT

A permanent magnet electrodynamic suspension system includes a conductor track and a suspension and guidance device. The conductor track is disposed on a roadbed, and the suspension and guidance device is disposed above the conductor track. The suspension and guidance device includes a first permanent magnet array and a second permanent magnet array. The first permanent magnet array and the second permanent magnet array are the same in the magnetization direction arrangement. The first permanent magnet array and the second permanent magnet array are arranged perpendicular to each other. A guidance method for the permanent magnet electrodynamic suspension system is further provided.

7 Claims, 14 Drawing Sheets

(56) References Cited

U.S. PATENT DOCUMENTS

2018/0237996 A1     8/2018  Sadeghi
2021/0316616 A1 *  10/2021  Mielczarek ............... E01B 2/00

FOREIGN PATENT DOCUMENTS

| | | |
|---|---|---|
| CN | 105463957 A | 4/2016 |
| CN | 109292464 A | 2/2019 |
| CN | 111086396 A | 5/2020 |
| CN | 112955605 A | 6/2021 |
| CN | 113415170 A | 9/2021 |
| CN | 113652909 A | 11/2021 |
| CN | 113882197 A | 1/2022 |
| CN | 114083992 A | 2/2022 |
| FR | 2149934 A5 | 3/1973 |
| WO | 8705271 A1 | 9/1987 |
| WO | 2010022637 A1 | 3/2010 |
| WO | 2020085949 A1 | 4/2020 |

OTHER PUBLICATIONS

Jiayang Xiong et al., Research progress of high-speed maglev rail transit, Journal of Traffic and Transportation Engineering, 2021, vol. 21, No. 1, pp. 177-198.

* cited by examiner

PERMANENT MAGNET ELECTRODYNAMIC SUSPENSION SYSTEM AND GUIDANCE METHOD THEREFOR

CROSS-REFERENCE TO RELATED APPLICATION

This application claims the benefit of priority from Chinese Patent Application No. 202210659353.7, filed on Jun. 13, 2022. The content of the aforementioned application, including any intervening amendments thereto, is incorporated herein by reference in its entirety.

TECHNICAL FIELD

The application relates to permanent magnet electrodynamic magnetic levitation (maglev), and more particularly to a permanent magnet electrodynamic suspension system (PMEDS) and a guidance method therefor.

BACKGROUND

Electrodynamic maglev trains feature high speed, low energy consumption, strong climbing ability, excellent safety and comfort, low noise, no fuel consumption, and less pollution, and are suitable for high-speed and ultra-high-speed operation. When the auxiliary guide wheels are used, the guideway is needed to be designed in U-shaped, which complicates the structure and increases the construction cost. In addition, the direct contact between the auxiliary guide wheels and the guideway will cause mechanical friction and wear, which is not conducive to the turning of the high-speed maglev trains.

The normal-conducting magnetic attraction-based guidance system has a small suspension air gap, and thus requires an accurate control system. Moreover, the normal-conducting magnetic attraction-based guidance system also has large energy consumption and poor self-stability. By comparison, the permanent magnet electrodynamic magnetic repulsion-based guidance system has superior self-stability, but the guidance is unstable, and two additional guidance permanent magnets will increase the cost. Moreover, compared to the conventional flat conductor guideway, the adopted U-shaped conductor guideway has larger laying difficulty and higher construction and maintenance cost. The guidance permanent magnet will generate inherent magnetoresistance that hinders the movement of the train while generating the guidance force, which increases the energy consumption of the guidance system.

SUMMARY

In view of the deficiencies in the prior art, this application provides a permanent magnet electrodynamic suspension system (PMEDS) and a guidance method therefor.

Technical solutions of this application are described as follows.

In a first aspect, this application provides a permanent magnet electrodynamic suspension system, including:
  a conductor track; and
  a suspension and guidance device;
  wherein the conductor track is laid on a roadbed; and the suspension and guidance device is arranged above the conductor track;
  the suspension and guidance device comprises a first permanent magnet array and a second permanent magnet array; the first permanent magnet array and the second permanent magnet array are the same in magnetization direction arrangement; and the first permanent magnet array and the second permanent magnet array are arranged perpendicular to each other;
  the first permanent magnet array comprises at least one first permanent magnet arranged side by side along a transverse direction; the first permanent magnet array has a bar-shaped structure; the first permanent magnet array is disposed parallel to an extension direction of the conductor track; and a magnetic field change direction of the first permanent magnet array is parallel to a travel direction of a magnetic levitation (maglev) train; and
  the second permanent magnet array comprises at least one second permanent magnet arranged side by side along a vertical direction; the second permanent magnet array has a bar-shaped structure; the second permanent magnet array is arranged perpendicular to the extension direction of the conductor track; a magnetic field change direction of the second permanent magnet array is perpendicular to the travel direction of the maglev train; and the second permanent magnet array is distributed along a transverse direction of the maglev train.

In an embodiment, the permanent magnet electrodynamic suspension system further includes:
  a bogie; and
  two lifting-lowering devices;
  wherein the bogie is provided on the maglev train; the two lifting-lowering devices are provided below the bogie; the first permanent magnet array is connected to a bottom of the bogie by one of the two lifting-lowering devices; and the second permanent magnet array is connected to the bottom of the bogie by the other of the two lifting-lowering devices.

In an embodiment, the lifting-lowering device is a threaded transmission lifting-lowering mechanism or a sloped transmission lifting-lowering mechanism.

In an embodiment, each of the two lifting-lowering devices includes an outer frame and a screw rod connector, and the outer frame is connected to the bottom of the bogie by the screw rod connector.

In an embodiment, a motor is fixedly connected to a bending arm for driving the screw rod to rotate and drive a screw nut fixed-connected on a magnet base to lift and lower, thereby adjusting a suspension gap between the permanent magnet on the magnet base and the conductor track.

In an embodiment, the permanent magnet electrodynamic suspension system further includes:
  a conductor plate;
  a stator coil; and
  an insulation base;
  wherein the conductor plate is provided below the bogie; the stator coil is provided under the conductor plate; the stator coil is provided on the insulation base; and the insulation base is provided on the roadbed.

In an embodiment, an end face of the first permanent magnet array close to the conductor track is located at the same height as an end face of the second permanent magnet array close to the conductor track.

In a second aspect, this application provides a guidance method for the permanent magnet electrodynamic suspension system, including:
  (a) receiving a first control command configured to start and accelerate the maglev train in a standstill state;

(b) monitoring a power supply condition and an operation status of the maglev train in real time, wherein the power supply condition comprises an actual power supply frequency and a power supply slip rate, and the operation status comprises an operation speed and a position of the maglev train;

(c) according to the power supply condition and the operation status, calculating an optimal power supply frequency of the maglev train, an optimal power supply slip rate corresponding to the optimal power supply frequency, and an acceleration required by the maglev train;

(d) according to the operation speed of the maglev train, adjusting the optimal power supply frequency, the optimal power supply slip rate, and the acceleration;

(e) sending a second control command, wherein the second control command is configured to be executed to control the maglev train to reach a preset speed according to the optimal power supply frequency, the optimal power supply slip rate and the acceleration after adjusted;

(f) sending a third control command configured to be executed to send a switching signal to control the two lifting-lowering devices to start when the maglev train reaches a suspension speed;

(g) collecting a suspension height of the maglev train in real time, and adjusting the suspension height to a preset suspension height;

(h) receiving a fourth control command, wherein the fourth control command is configured to be executed to control the train to travel at the preset speed; and (i) collecting a y-direction offset speed of the maglev train and a height of the second permanent magnet array in real time;

wherein when the maglev train is about to enter a suspension state, the switching signal is sent to control the two lifting-lowering devices to start to adjust a guidance height to a preset guidance height, so as to allow the maglev train to stably enter the suspension state; during operation in the suspension state, it is determined whether the y-direction offset speed exceeds a threshold when y-direction offset occurs; if yes, the switching signal is sent to control the two lifting-lowering devices to start to reduce the guiding height; otherwise, the y-direction offset speed of the maglev train is continuously monitored in real time.

In an embodiment, the guidance method further includes:

(j) receiving a fifth control command, wherein the fifth control command is configured to be executed to send the switching signal to the two lifting-lowering devices, so as to lift the first permanent magnet array and the second permanent magnet array to a preset braking height;

(k) according to the fifth control command, collecting a braking deceleration of the maglev train in real time;

(l) according to the braking deceleration, calculating a braking distance required by the maglev train;

(m) obtaining a first information, wherein the first information comprises an actual distance between the maglev train and a platform; and (n) comparing the actual distance with a braking distance to determine whether a braking requirement is satisfied; if the braking distance is less than the actual distance, maintaining the maglev train in a current operation status; and if the braking distance is greater than the actual distance, adjusting a current supplied to the maglev train until the braking requirement is met.

In an embodiment, the guidance method further includes:

receiving a sixth control command configured to be executed to brake the maglev train;

sending a seventh control command, wherein the seventh control command is configured to be executed to send the switching signal to the first permanent magnet array and the second permanent magnet array, so that the first permanent magnet array and the second permanent magnet array rise to the preset braking height;

according to the braking deceleration, calculating the braking distance required by the maglev train;

obtaining a second information, wherein the second information comprises the actual distance between the maglev train and the platform; and comparing the actual distance with the braking distance to determine whether the braking requirement is satisfied; if the braking distance is less than the actual distance, maintaining the maglev train in the current operation state; and if the braking distance is greater than the actual distance, adjusting the current supplied to the maglev train until the braking requirement is met.

Compared to the prior art, this application has the following beneficial effects.

1. The permanent magnet electrodynamic suspension system provided herein is a lightly damped system or an underdamped system, and the guiding damping device can provide lateral damping for the permanent magnet electrodynamic suspension system, realize stable guidance, enhance the smoothness and safety of the system, and solve the problem of unguided function.

2. The permanent magnet electrodynamic suspension system has the advantages of simple structure, low cost, and easy operation. The damping effect can be realized only by adding a set of permanent magnets to the maglev train.

3. The conductor track does not need to be reconstructed, and only weak magnetic good conductor plate needs to be laid along a traveling path of the train, interacts with the suspension permanent magnet to achieve the suspension function, and interacts with the guiding permanent magnet to generate the guiding damping. Compared with the conventional permanent magnet electrodynamic magnetic repulsion-based guidance system, the guidance system in this application reduces the difficulty of laying the conductor track, reduces the laying cost and the maintenance cost of the conductor track, and prolongs the service life.

4. During the operation, the magnetic resistance generated by the interaction between the guiding permanent magnet and the conductor track formed using the conductor plate is very small, which has a small impact on the suspension system, and does not produce the additional energy consumption of the system.

BRIEF DESCRIPTION OF THE DRAWINGS

The accompanying drawings used in the embodiments of the present disclosure will be briefly introduced below to illustrate the technical solutions in the embodiments of the present disclosure more clearly. Obviously, presented in the accompanying drawings are merely some embodiments of the present disclosure, which are not intended to limit the disclosure. For those skilled in the art, other drawings can also be obtained based on these drawings without paying creative efforts.

Figure 1:
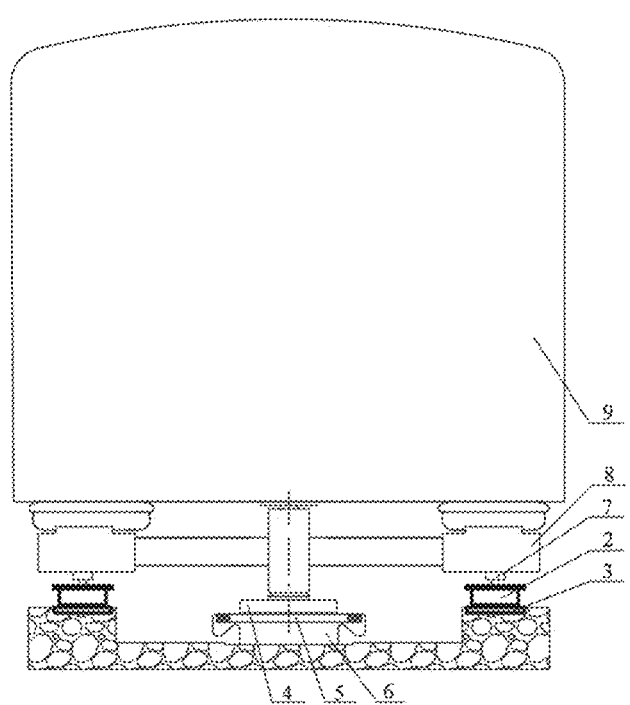
FIG. 1 schematically shows an overall structure of a permanent magnet electrodynamic suspension system according to an embodiment of the present disclosure.

In the figures: 1—first permanent magnet array; 2—second permanent magnet array; 3—conductor track; 4—conductor plate; 5—stator coil; 6—insulation base; 7—lifting-lowering device; 8—bogie; 9—vehicle body.

DETAILED DESCRIPTION OF EMBODIMENTS

The technical solutions of the disclosure will be described in detail below in combination with the drawings in the embodiments to make the technical solutions, objects and advantages of the disclosure clearer. Obviously, described below are merely some embodiments of the disclosure, which are not intended to limit the disclosure. It should be noted that the components in the embodiments and the drawings herein may be arranged and designed in different forms. Accordingly, the following detailed description is merely illustrative, and is not intended to limit the scope of the disclosure. For those skilled in the art, other embodiments obtained based on these embodiments without paying creative efforts should fall within the scope of the disclosure defined by the appended claims.

It should be noted that similar reference signs and letters indicate similar items in the drawings. Thus, once an element has been defined in one drawing, there is no need to further define and explain this element in subsequent drawings. In addition, the terms "first" and "second" are merely descriptive, and cannot be understood as indicating or implying relative importance.

The permanent magnet electrodynamic suspension technology is mainly based on Lenz's law. Due to a relative movement between the source magnetic field generated by the permanent magnet and the weak magnetic good conductor, the current is induced in the weak magnetic good conductor, the current will generate a mirror magnetic field opposite to the source magnetic field. Due to interaction between the mirror magnetic field and the source magnetic field to generate an electromagnetic force, the component force of the electromagnetic force in the vertical direction is a levitation force to overcome the system own weight, and the component force of the electromagnetic force in the horizontal direction is a magnetic resistance that hinders the relative movement. However, the permanent magnet electrodynamic suspension system is the lightly damped system or the underdamped system, and a light vibration can cause the system extremely unstable. In particular, during the high-speed operation, factors such as strong lateral gas disturbances and uneven conductor tracks will threaten the system seriously. Therefore, as a high-speed ground transportation train, the suspension and guidance device is the basis for ensuring its safe and stable operation.

At present, the guidance technology mainly includes auxiliary wheel-based guidance system, normal-conducting magnetic attraction-based guidance system, and electrodynamic magnetic repulsion-based guidance system. Auxiliary guide wheels are often widely used as mechanical guidance in magnetic levitation systems. Auxiliary guide wheels are installed on both sides of the vehicle body, and the rolling friction between the auxiliary guide wheels and the track realizes limit support, so that the maglev train travels along a centerline of the track. The normal-conducting magnetic attraction-based guidance system has a similar principle to the electrodynamic magnetic repulsion-based guidance system, which installs a set of guide electromagnets on both sides of the maglev train to form the fixing gap between the vehicle body and the track. When the maglev train shifts left and right, the train returns to the appropriate position through the interaction between the on-board guide electromagnet and the track.

The electrodynamic magnetic repulsion-based guidance system mainly includes the superconducting electrodynamic magnetic repulsion-based guidance system and the permanent magnet electrodynamic magnetic repulsion-based guidance system. The superconducting electrodynamic magnetic repulsion-based guidance system, such as Japanese MLX superconducting maglev train, lays the 8-shaped coil evenly on the conductor track on both sides. When the train is offset left and right, the gaps between the on-board superconducting magnet and the coil on both sides are different, and the guiding force generated at the side with a small gap is greater than that at the side with a large gap, which forms a recovery force to return the train to the appropriate position. Further, the permanent magnet electrodynamic magnetic repulsion-based guidance system, such as American Magplane, changes the section shape of the conductor track. The conductor track with arc-shaped section uses the component force of the levitation force as the guiding force, so that the train returns to the appropriate position when offset. Or, a set of permanent magnet arrays is installed on both sides of the train. When the train is offset, because the gaps between the on-board guiding permanent magnets and the conductor track on both sides of the train are different, the guiding force generated at the side with small gap is greater than that at the side with large gap, which forms the recovery force to make the train return to the appropriate position to achieve the guidance function.

When the auxiliary guide wheels are used in the prior art, the direct contact between the auxiliary guide wheels and the guideway causes mechanical friction and wear and produces high noise, which is not conducive to the turning of the high-speed maglev trains. The normal-conducting magnetic attraction-based guidance system has a small suspension air gap, requires an accurate control system, and has large energy consumption and poor self-stability. Although the permanent magnet electrodynamic magnetic repulsion-based guidance system has superior self-stability, the guidance is unstable, and two additional guidance permanent magnets will increase the cost. Moreover, compared to the conventional flat conductor guideway, the adopted U-shaped conductor guideway has larger laying difficulty and higher construction and maintenance cost. The guidance permanent magnet will generate inherent magnetoresistance that hinders the movement of the train while generating the guidance force, which increases the energy consumption of the guidance system.

For the guidance system in the present disclosure, when the vehicle body travels normally, the interaction, between the on-board suspension permanent magnet and the conductor track formed by the weak magnetic good conductor, generates levitation force and magnetic resistance to realize the suspension function. The interaction, between the on-board guiding permanent magnet and the conductor track, realizes the guidance function and ensures the smooth and safe operation of the train. When the vehicle body produces a y-direction offset, the electromagnetic force generated between the guiding permanent magnet and the conductor track is mainly the guiding force in the y-direction, and the kinetic energy generated by the offset will be consumed by the thermal energy generated by the guiding force.

The ordinary small cars are modified by installing the suspension magnets and removable guiding magnets, then the experiments in the absence of the guiding magnet the guiding magnet and experiments in the presence of the guiding magnet are carried out under the same working conditions.

Specifically, the car first accelerates on the road. After reaching a certain initial speed, the suspension magnet is centered to the conductor track, then the car drive into the conductor track. The interact between the suspension magnet and the conductor track achieves levitation, realizes the car body does not have a large offset and drive out of the conductor track smoothly. During the experiment, the guiding force, suspension gap and lateral deflection angle are monitored in real time and are collected, and the experimental results with or without the guiding magnet are shown in FIGS. 9-14. When the guiding magnet is not installed, the guiding force received by the car body is reduced after entering the conductor track, and the action time of the guiding force is short. The car body undergoes a large shift, and the deflection angle can reach 180°. The car body quickly leaves the suspension state, the suspension gap is small, the suspension time is short, causing the whole traveling failure. When the guiding magnet is installed in the car body, the guiding force is significantly increased, and the guiding force acts for a long time. The deflection angle is significantly reduced, and the car body is easier to control. The suspension gap is increased, the suspension time becomes longer, and the whole traveling in the conductor track can be successfully completed. The results demonstrate that the guiding magnets in the permanent magnet electrodynamic suspension system are effective.

When the car travels on the curve or uneven road, and the car produces the obvious y-direction offset, the component force in the y-direction generated by the interaction between the guiding permanent magnet and the conductor track will be used as a guiding damper to hinder the continuous offset of the car, enhancing the operation safety and smoothness of the suspension system.

Embodiment 1

Figure 2:
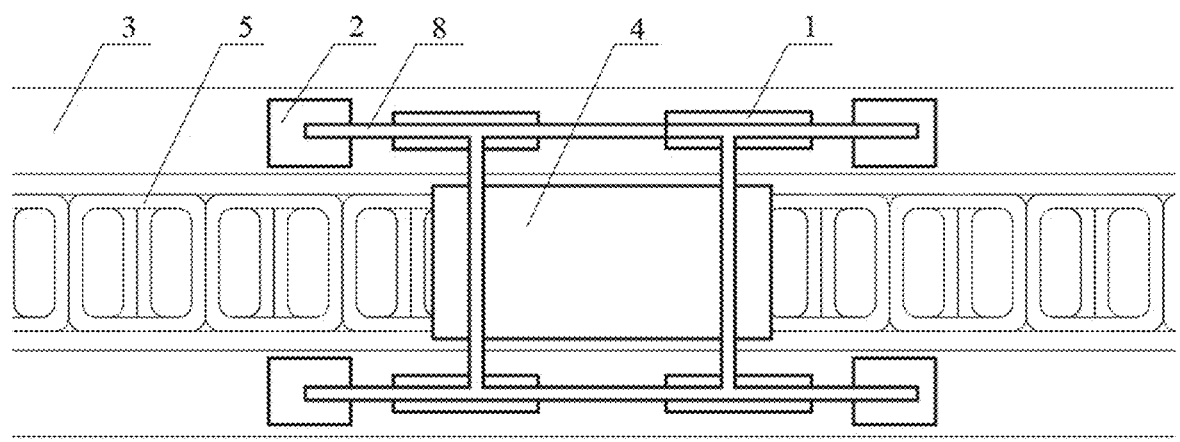
FIG. 2 is a top view of the permanent magnet electrodynamic suspension system according to an embodiment of the present disclosure.

As shown in FIGS. 1-2, a permanent magnet electrodynamic suspension system provided herein a conductor track 3 and a suspension and guidance device. The conductor track 3 is laid on a roadbed, and the suspension and guidance device is arranged above the conductor track 3.

The suspension and guidance device includes a first permanent magnet array 1 and a second permanent magnet array 2. The first permanent magnet array 1 and the second permanent magnet array 2 are the same in magnetization direction arrangement, and the first permanent magnet array 1 and the second permanent magnet array 2 are arranged perpendicular to each other.

In some embodiments, the first permanent magnet array 1 includes at least one first permanent magnet arranged side by side along a transverse direction. The first permanent magnet array 1 has a bar-shaped structure. The first permanent magnet array 1 is disposed parallel to an extension direction of the conductor track 3. A magnetic field change direction of the first permanent magnet array 1 is parallel to a travel direction of a maglev train.

In some embodiments, the second permanent magnet array 2 includes at least one second permanent magnet arranged side by side along a vertical direction. The second permanent magnet array 2 has a bar-shaped structure. The second permanent magnet array 2 is perpendicular to the extension direction of the conductor track 3. A magnetic field change direction of the second permanent magnet array 2 is perpendicular to the travel direction of the train. The second permanent magnet array 2 is distributed along a transverse direction of the maglev train.

It should be noted that the guiding damping device for the permanent magnet electrodynamic suspension system mainly includes the first permanent magnet array 1, the second permanent magnet array 2 and the conductor track 3. The first permanent magnet array 1 is the suspension permanent magnet, the second permanent magnet array 2 is the guiding permanent magnet, and the conductor track 3 is formed by the weak magnetic good conductor. Specifically, the suspension permanent magnet and the guiding permanent magnet are spliced by several pieces of Nd—Fe—B permanent magnets, and the magnetization directions of the suspension permanent magnet and the guiding permanent magnet are arranged periodically according to the Halbach array, and the magnetization angle is better between 30° and 90°.

The difference between the suspension permanent magnet and the guiding permanent magnet is as follows. The first permanent magnet array 1 is arranged in the x-direction according to the Halbach array, and the second permanent magnet array 2 is arranged in the y-direction according to the Halbach array.

Figure 4:
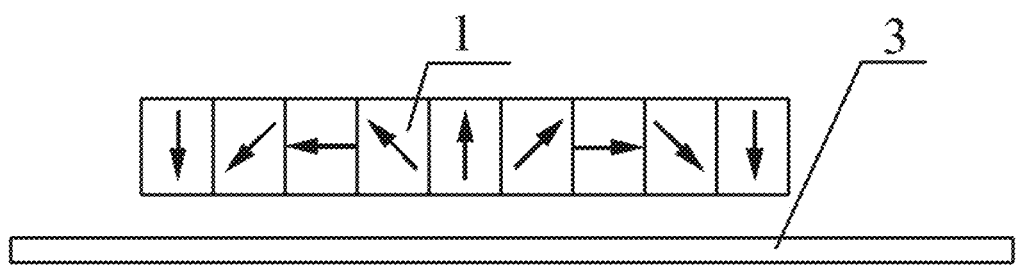
FIG. 4 schematically shows magnetization direction arrangement of the first permanent magnet array according to an embodiment of the present disclosure.

As shown in FIG. 4, the first permanent magnet array 1 interacts with the conductor track 3 to achieve the suspension function while traveling in the x-direction.

Figure 5:
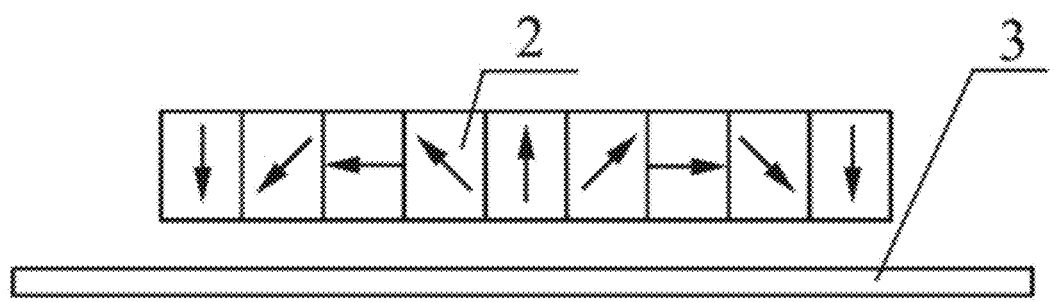
FIG. 5 schematically shows magnetization direction arrangement of the second permanent magnet array according to an embodiment of the present disclosure.

During traveling, when the suspension system is disturbed and offset in the y-direction, as shown in FIG. 5, the second permanent magnet array 2 will interact with the conductor track 3 to generate an electromagnetic force. The component force of the electromagnetic force in the y-direction will hinder the system offset in the form of the guide damping to achieve the guidance function to ensure the alignment of the train.

In some embodiments, a bogie 8 is provided on the train. Two lifting-lowering device 7 is provided under the bogie 8. The first permanent magnet array 1 is connected to a bottom of the bogie 8 by one of the two lifting-lowering devices 7; and the second permanent magnet array 2 is connected to the bottom of the bogie 8 by the other of the two lifting-lowering devices 7.

In some embodiments, the lifting-lowering device 7 includes an outer frame and a screw rod connector, and the outer frame is connected to the bottom of the bogie 8 by the screw rod connector.

In some embodiments, a conductor plate 4 is provided below the bogie 8. A stator coil 5 is provided under the conductor plate 4. The stator coil 5 is disposed on an insulation base 6, and the insulation base 6 is provided on the roadbed. The stator coil 5, the insulation base 6 and the on-board conductor plate 4 form a linear induction motor to pull the train in the x-direction, and the stator coil 5, the insulation base 6 and the conductor track 3 are laid on the roadbed.

In an embodiment, an end face of the first permanent magnet array 1 close to the conductor track 3 is at the same height as an end face of the second permanent magnet array 2 close to the conductor track 3.

Figure 3:
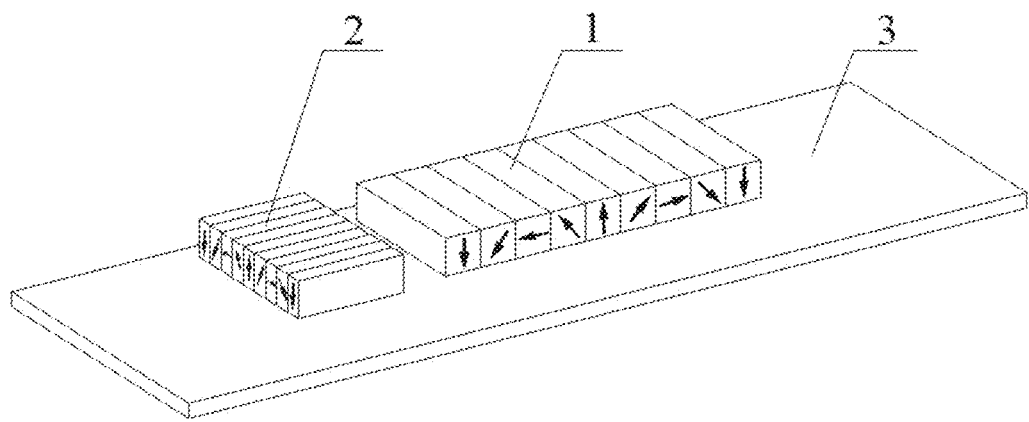
FIG. 3 is a perspective view of a core portion according to an embodiment of the present disclosure.
Figure 6:
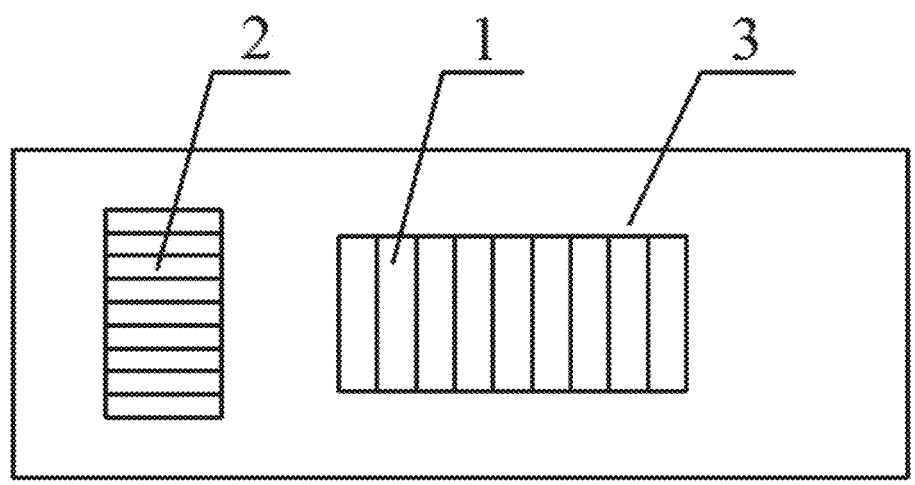
FIG. 6 is a top view of core portion according to an embodiment of the present disclosure.

FIG. 3 shows a relative position of the suspension permanent magnet and the guiding permanent magnet. FIG. 6 is a top view showing a relative position of the suspension permanent magnet and the guiding permanent magnet. FIG. 1 is a schematic diagram showing that the train travels in the suspension state, where the first permanent magnet array 1 and the second permanent magnet array 2 are connected to the bottom of the bogie 8 through the lifting-lowering devices 7.

It should be noted that the conductor track 3 may be made of aluminum, copper and other materials.

Embodiment 2

In this embodiment, the electromagnetic force generated by the permanent magnet electrodynamic suspension system is directly related to the operating speed and suspension gap, so the suspension gap between the suspension magnet and guiding magnet and the conductor track 3 can be controlled by the lifting-lowering device 7, so as to control the magnitude of the electromagnetic force.

A guidance method for the above-mentioned permanent magnet electrodynamic suspension system includes the start and acceleration process, the suspension operation process and the brake process.

The start-acceleration process is performed by the following steps.

A first control command is received for starting and accelerating the train in a standstill state.

A power supply condition and an operation status of the train are monitored in real time. The power supply condition includes an actual power supply frequency and a power supply slip rate, and the operation status of the train includes an operation speed and a position of the train.

According to the power supply condition and the operation status, an optimal power supply frequency of the train, an optimal power supply slip rate corresponding to the optimal power supply frequency, and an acceleration required by the train are calculated.

According to the operation speed of the train, the optimal power supply frequency, the optimal power supply slip rate, and the acceleration are adjusted.

A second control command is configured to be executed to control the train to reach a preset speed according to the optimal power supply frequency, the optimal power supply slip rate and the acceleration after adjusted.

Specifically, when the train is about to start and accelerate in a static state, after receiving the acceleration command (first control command), the control system will control the ground power supply to provide three-phase alternating current into the stator coil 5 by a traction inverter and inductor, to monitor in real time the actual power supply frequency f, power supply slip rate s, operation speed v, position, motor working air gap, working voltage and current, and to calculate the optimal power supply frequency f', the corresponding optimal power supply slip rate sf' and the acceleration required by the train. Based on the train operation speed $v=2\tau f(1-s)$, f and s are adjusted to satisfy f=f', and the train is gradually accelerated to a preset peed v*. Among them, f is the actual power supply frequency of a linear induction motor, s is the power supply slip rate of the motor, v is the operation speed of the train, f' is the optimal power supply frequency obtained after calculation, sf' is the optimal power supply slip rate, $\tau$ is the pole distance of the motor, and v* is the preset speed of the train.

The suspension process is performed by the following steps.

In some embodiments, a third control command (suspension command) is sent, and the suspension command is configured to be executed to send a switching signal to control the lifting-lowering device 7 to start when the maglev train reaches a suspension speed.

A suspension height of train is collected in real time and adjusted to a preset suspension height.

A fourth control command is received to control the train to travel at the preset speed.

A y-direction offset speed of the maglev train and a height of the second permanent magnet array 2 are collected in real time.

While the vehicle body 9 is running in the suspension state, it is determined whether the y-direction offset speed exceeds a threshold when y-direction offset occurs; if yes, the switching signal is sent to control the two lifting-lowering devices to start to reduce the guiding height; otherwise, the y-direction offset speed of the maglev train is continuously monitored in real time.

Specifically, the train is accelerated from 0 to v* under the drive of the linear induction motor. When the operation speed of the train is detected to reach the suspension speed $v_1$, that is, $v=v_1$, the suspension command will be sent to the control system, at this time the control system will send the switching signal to control the lifting-lowering device 7 to start, and collect real-time change information of the suspension height h. According to the preset suspension height h* of the suspension system, the lifting-lowering device 7 controls the suspension magnet to lower and satisfy h=h*, so that the suspension magnet works at the preset suspension height. The suspension system enters a suspension operating state. Among them, $v_1$ is the lifting speed of the train, and h* is the preset suspension height of the suspension system.

It should be noted that after entering the suspension state, the train and the conductor track achieve contactless operation, and the train continues to accelerate by the driving of the linear induction motor until the train reaches the preset peed v*, that is, v=v*. At this time, the control system will receive a constant speed running command for controlling the train to maintain the preset peed. At the same time, the control system will collect the real-time change information of the y-direction offset speed $v_y$ of the train and the height of the guiding magnet h'. When the train travels curve or uneven track surface, the vehicle body 9 as a whole produces obvious y-direction offset. At this time, the offset speed $v_y$ exceeds the threshold, and a guiding command will be sent to the control system. Among them, $v_y$ is the y-direction offset speed of the train.

Based on the formula $2a_y x_y = 0 - v_y^2$, the deceleration $a_y$, for reducing the y-direction offset speed of the train to 0, is calculated.

$X_y$ is the preset minimum y-direction offset. According to the formula $F_g = ma_y$, the guiding force $F_g$ that provides the required deceleration is calculated, where m is the mass of the train. Based on the obtained $F_g$, the working height $h^{*'}$ of the guiding magnet is calculated. The control system will send the switching signal to control the start of the lifting-lowering device 7, so that the guiding magnet is reduced to the required height, that is, $h' = h^{*'}$, to realize the guidance function.

The braking process is performed by the following steps.

A fifth control command was received, and the fifth control command is configured to be executed to send the switching signal to the two lifting-lowering devices 7, so as to lift the first permanent magnet array 1 and the second permanent magnet array 2 to a preset braking height.

According to the fifth control command, a braking deceleration of the maglev train in real time is collected.

According to the braking deceleration, a braking distance required by the maglev train is calculated.

The first information including an actual distance between the train and a platform is obtained.

The actual distance is compared with the braking distance to determine whether a braking requirement is satisfied. If the braking distance is less than the actual distance, maintaining the maglev train in a current operation status. If the braking distance is greater than the actual distance, adjusting a current supplied to the maglev train until the braking requirement is met.

In some embodiments, the braking process further includes the following steps.

A sixth control command configured to be executed to brake the maglev train is received.

A seventh control command is sent. The seventh control command is configured to be executed to send the switching signal to the first permanent magnet array 1 and the second permanent magnet array 2, so that the first permanent magnet array 1 and the second permanent magnet array 2 rise to the preset braking height.

According to the braking deceleration, the braking distance required by the train is calculated.

A second information, which includes calculating the actual distance between the train and the platform, is obtained.

The actual distance is compared with the braking distance to determine whether the braking requirement is satisfied. If the braking distance is less than the actual distance, maintaining the maglev train in the current operation state; and if the braking distance is greater than the actual distance, adjusting the current supplied to the maglev train until the braking requirement is met.

In some embodiments, when the train needs to brake and stop, the control system receives a stop command and sends the switching signal to the lifting-lowering devices of the suspension permanent magnet and guiding permanent magnet, so that the suspension permanent magnet and guiding permanent magnet rises, $h = h_0$, $h' = h_0'$. Wherein $h_0$, $h_0'$ respectively the preset braking height of the suspension permanent magnet and guiding permanent magnet. At the same time, the control system sends a braking signal to the linear motor and adjusts f and s for satisfying f=f', so that the operation speed v of the train is continuously reduced. Real-time braking deceleration $a_x$ of the train is collected, and according to the formula $2a_x x = 0 - v^2$, the required braking distance x of the train is calculated. Whether the train meets the braking requirements in the current state is determined by comparing the braking distance x and the actual distance x' between the train and the platform. If x<x', the current operation g state of the train will be maintained; if x>x', the supply current of the motor will increase, or three-phase current phase sequence of the motor will change until the braking requirements are met. Wherein $a_x$ is the braking deceleration of the train, x is the calculated braking distance, and x' is the actual distance between the train and the platform.

The working principle of the permanent magnet electrodynamic suspension system of the present disclosure is as follows.

Both the suspension system and the guidance system work according to the law of electromagnetic induction. For the suspension system, the suspension permanent magnet is arranged along the x-direction, the magnetic field strength of the suspension permanent magnet is approximately sinusoidally distributed in the x-direction and is evenly distributed in the y-direction. When the on-board suspension permanent magnet travels in the x-direction at a certain speed, the suspension permanent magnet and the conductor track 3 have relative displacement in the x-direction under a certain suspension gap. The source magnetic field generated by the suspension permanent magnet cuts the conductor track 3, due to the non-uniformity of the magnetic field in the x-direction, an induced eddy current will be generated inside the conductor, thereby generating an induced magnetic field and induced electromotive force.

$$e = -\frac{d\phi}{dt}$$

$$i(t) = \frac{\phi_{(0)}}{L} \frac{1}{1+(R/\omega L)^2}\left[\sin \omega t + \frac{R}{\omega L}\cos \omega t\right]$$

In the formula above, e is the induced electromotive force; i(t) is the induced current; φ is the magnetic flux through the conductor plate; R is the resistance of the conductor plate; L is the conductor plate inductance; and ω is the equivalent angular frequency.

The induced magnetic field will interact with the source magnetic field of the permanent magnet. The component force of the generated electromagnetic force F in the z-direction is used to overcome the levitation force of the vehicle body own weight to achieve the suspension function, and the component force of the electromagnetic force F in the x-direction is expressed as the magnetic resistance, which will hinder the progress of the vehicle body.

$$F = J \times B$$

In the formula above, F is the generated electromagnetic force, J is the induced current generated in the conductor, and B is the magnetic induction strength of the source magnetic field of the permanent magnet.

For the guidance system, the guiding permanent magnet is arranged in the y-direction. The magnetic field strength of the guiding permanent magnet is approximately sinusoidally distributed in the y-direction and is evenly distributed in the x-direction. When the vehicle body 9 shifts in the y-direction as a whole during traveling, the guiding permanent magnet and the conductor track 3 have relative displacement in the y-direction. Due to the non-uniformity of the magnetic field in the y-direction, the source magnetic field generated by the guiding permanent magnet interacts with the induced magnetic field generated on the conductor track 3. The component force by the generated electromagnetic force in the z-direction is expressed as the levitation force which increases suspension performance of the suspension system. The component force in the y-direction is expressed as the guiding force $F_y$, which hinders the suspension system from continuing to offset and forms guiding damping. During travelling of the vehicle body 9 in the x-direction, because the magnetic field is evenly distributed in the x-direction, the interaction between the guiding permanent magnet and the conductor track 3 is very small, which will not affect the normal operation of the entire system.

Figure 7:
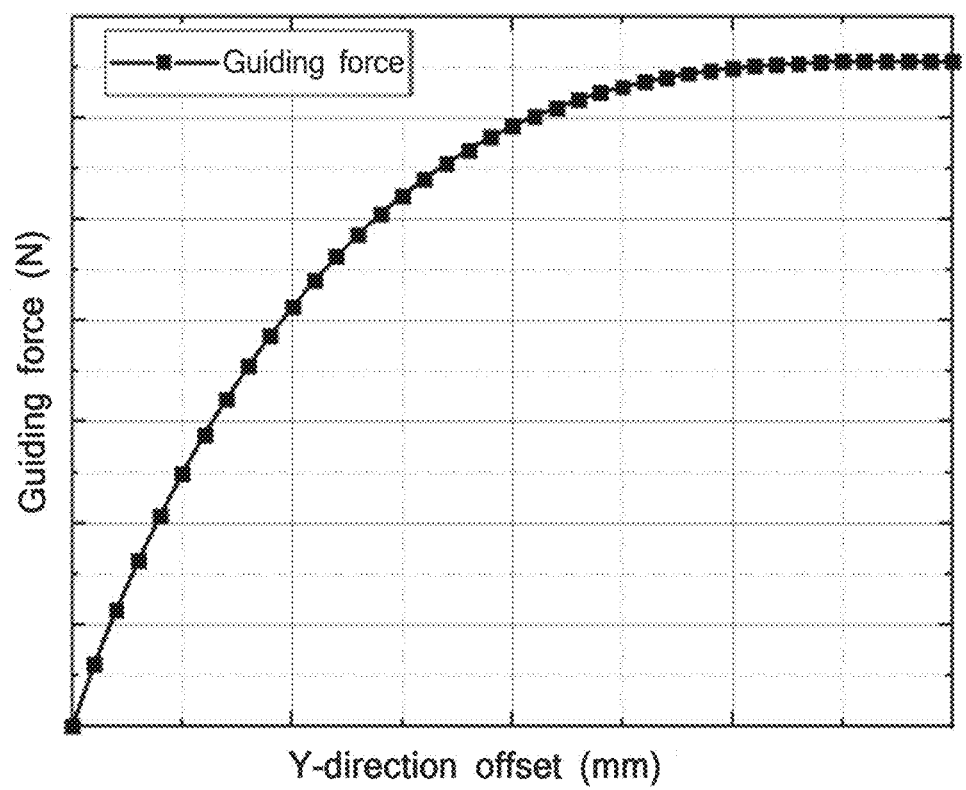
FIG. 7 shows change of a guiding force with an offset of a vehicle body according to an embodiment of the present disclosure.

FIG. 7 shows a change of the guiding force with the offset of the vehicle body 9 in the y-direction. It can be seen that the guiding force increases with the increase of the offset, which is in line with the working state of the guiding damping and equivalent to the elastic damping.

Figure 8:
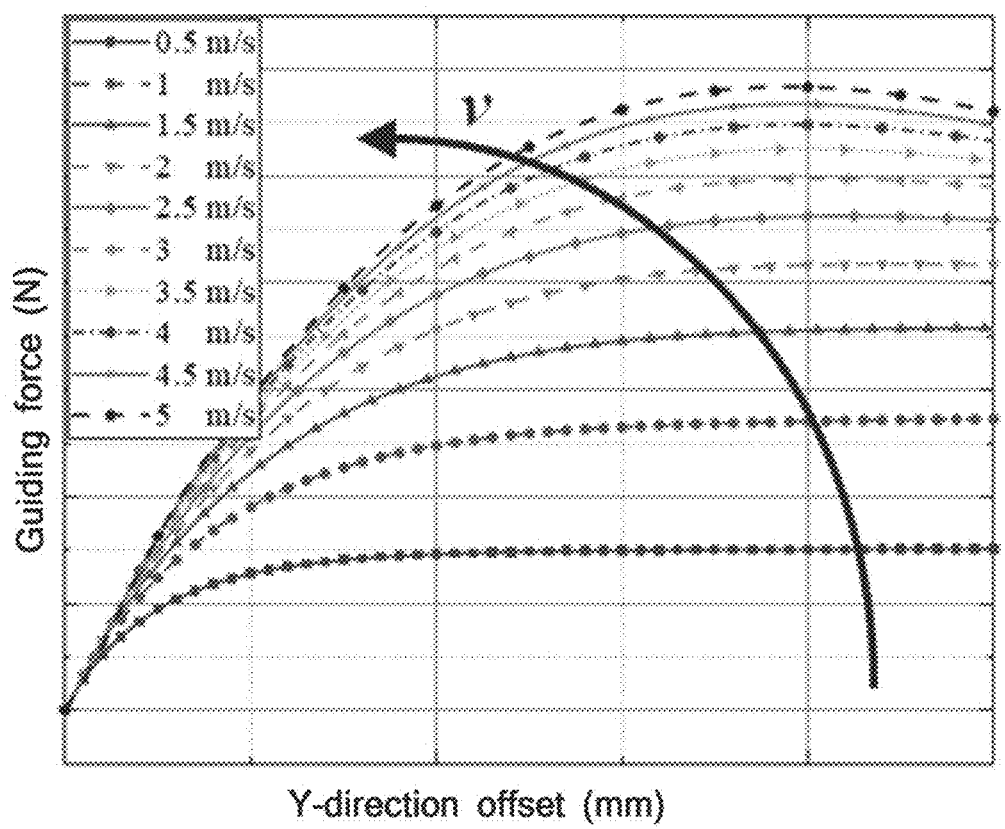
FIG. 8 shows change of the guiding force with the offset of the vehicle body at different speeds.
Figure 9:
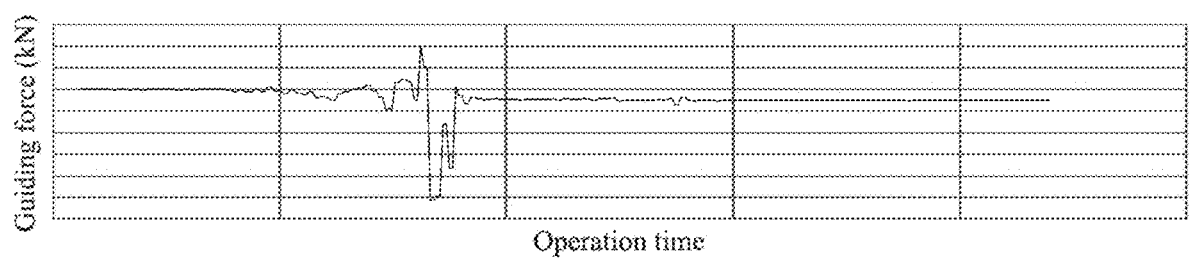
FIG. 9 shows change of the guiding force with time according to an embodiment of the present disclosure in the absence of a guiding magnet.
Figure 10:
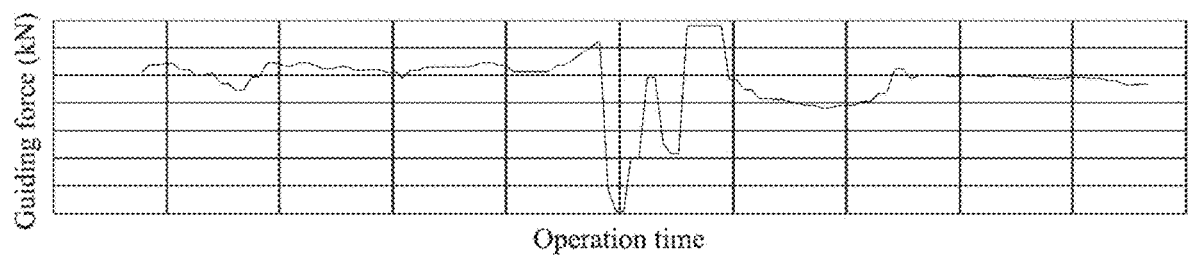
FIG. 10 shows change of the guiding force with time according to an embodiment of the present disclosure in the presence of the guiding magnet.
Figure 11:
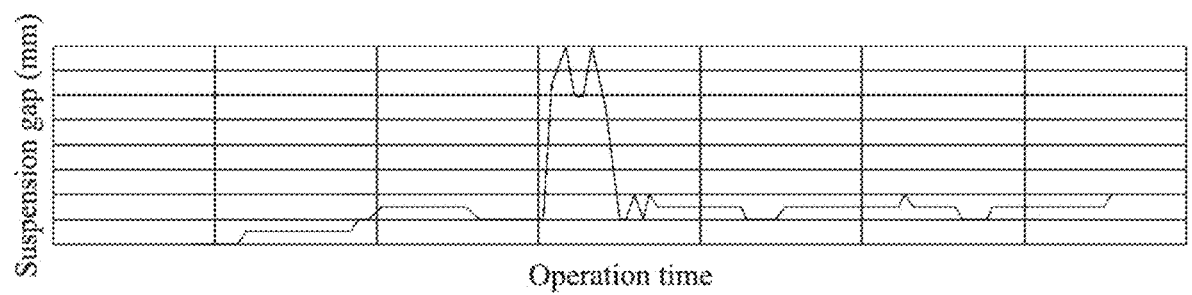
FIG. 11 shows change of a suspension gap with time according to an embodiment of the present disclosure in the absence of the guiding magnet.
Figure 12:
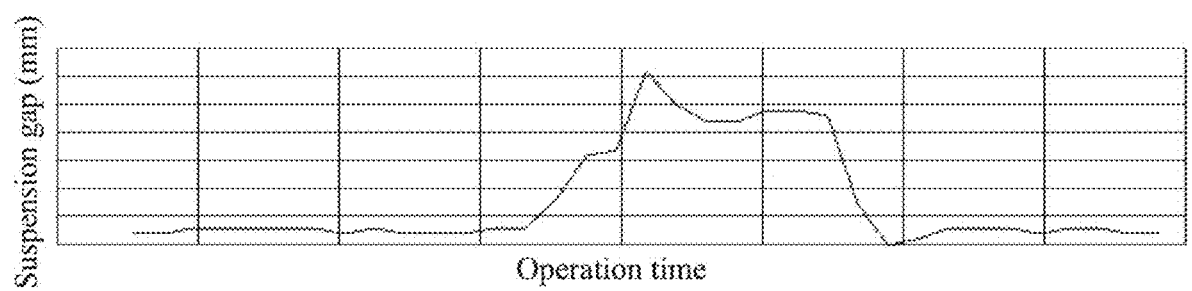
FIG. 12 shows change of the suspension gap with time according to an embodiment of the present disclosure in the presence of the guiding magnet.
Figure 13:
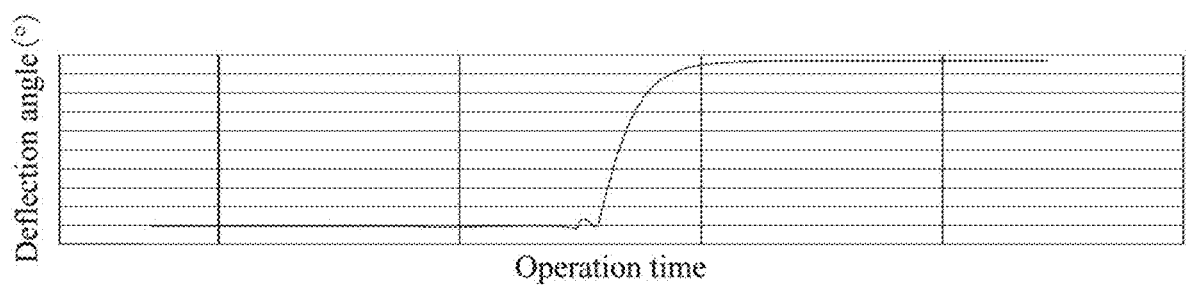
FIG. 13 shows change of a deflection angle of the vehicle body with time according to an embodiment of the present disclosure in the absence of the guiding magnet.
Figure 14:
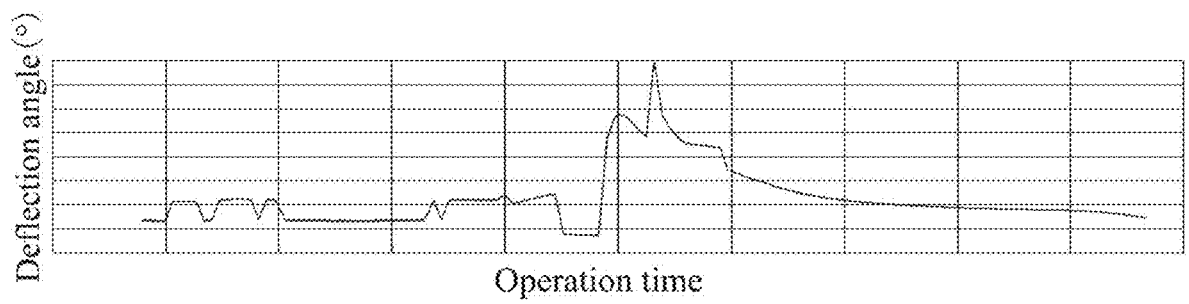
FIG. 14 shows change of the deflection angle of the vehicle body with time according to an embodiment of the present disclosure in the presence of the guiding magnet.

FIG. 8 shows a change of the guiding force with the offset of the vehicle body 9 in the y-direction under different speeds. It can be seen that the guiding force will change with the offset speed and increases with the increase of offset speed, so the guiding force $F_y$ can be equivalent to the damping force $F_d$.

$$F_y = \frac{B_0^2 \omega^2}{2RL} \frac{(R/\omega L)}{1+(R/\omega L)^2} e^{-2kz} = F_d = -Cm\frac{d_y^2}{dt}$$

$$F_y = ma = m\frac{dV_y}{dt}$$

In the formula above, Bo is the magnetic induction strength of the magnet surface on the strong magnetic field side; R is the resistance of the conductor plate; L is the conductor plate inductance; co is the equivalent angular frequency; k is the wavenumber, C is the damping coefficient; m is the mass of the train; $V_y$ is the offset speed of the vehicle body 9 in the y-direction, and a is the acceleration in the y-direction.

It is worth noting that the lateral guiding force is always opposite to the lateral speed. That is, when the train is running, the vehicle body 9 is shifted laterally, and the lateral component speed is large, and the guiding force will produce a large reverse acceleration a, so that the lateral speed of the train is reduced to 0 in a short time.

The kinetic energy generated by the y-direction offset is converted into the potential energy generated by equivalent damping, that is, the thermal energy consumed by the induced eddy current in the conductor track.

$$\frac{1}{2}mV_y^2 = F_y x_y = Q$$

In the formula above, $x_y$ is the offset of the vehicle body in the y-direction, and Q is the thermal energy consumed by induced eddy current.

In summary, compared to the prior art, this application has the following beneficial effects. The permanent magnet electrodynamic suspension system may be an underdamped system, and the guiding damping device can provide the damping for the permanent magnet electrodynamic suspension system, enhance the smoothness and safety of the system, and has the simple structure and low cost. The damping effect can be realized only by adding a set of permanent magnets to the train. The conductor track does not need to be reconstructed, and only weak magnetic good conductor plate needs to be laid along the traveling path of the train, interacts with the suspension permanent magnet to achieve the suspension function, and interacts with the guiding permanent magnet to generate the guiding damping. Compared with the conventional permanent magnet electrodynamic magnetic repulsion-based guidance system, the guidance system in this application reduces the difficulty of laying the conductor track, reduces the laying cost and the maintenance cost of the conductor track, and prolongs the service life. While the train is moving, the magnetic resistance generated by the interaction between the guiding permanent magnet and the conductor track is very small, which has a small impact on the suspension system, and does not produce the additional energy consumption of the system.

As used herein, it should be noted that the orientation or positional relationship indicated by the terms "center", "upper", "lower", "left", "right", "vertical", "horizontal", "inside", "outside" is based on the orientation or positional relationship shown in the accompanying drawings, or the orientation or positional relationship commonly placed when the product of the disclosure is used, which is only for the convenience of describing the technical solutions and simplifying the description, rather than indicating or implying that the indicated device or element must have a specific orientation, be constructed or operated in a specific orientation. Therefore, these terms should not be understood as a limitation of the present disclosure. In addition, the terms "first" and "second" are merely descriptive, and cannot be understood as indicating or implying relative importance.

As used herein, unless otherwise expressly specified and defined, the terms, such as "set", "mount", and "connect" should be understood in a broad sense, for example, it may be fixed connection, detachable connection, or integral connection; it may be direct connection or indirect connection through an intermediate medium; and it may be an internal communication between two members. For those skilled in the art, the specific meanings of the above terms can be understood according to specific situations.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A permanent magnet electrodynamic suspension system, comprising:
  a conductor track;
  a suspension and guidance device;
  a bogie; and
  two lifting-lowering devices;
  wherein the conductor track is laid on a roadbed; and the suspension and guidance device is arranged above the conductor track;
  the suspension and guidance device comprises a first permanent magnet array and a second permanent magnet array; the first permanent magnet array and the second permanent magnet array are the same in magnetization direction arrangement and the first permanent magnet array and the second permanent magnet array are arranged perpendicular to each other;

the first permanent magnet array comprises at least one first permanent magnet arranged side by side along a transverse direction; the first permanent magnet array has a bar-shaped structure; the first permanent magnet array is disposed parallel to an extension direction of the conductor track; and a magnetic field change direction of the first permanent magnet array is parallel to a travel direction of a magnetic levitation (maglev) train;

the second permanent magnet array comprises at least one second permanent magnet arranged side by side along a vertical direction; the second permanent magnet array has a bar-shaped structure; the second permanent magnet array is arranged perpendicular to the extension direction of the conductor track; a magnetic field change direction of the second permanent magnet array is perpendicular to the travel direction of the maglev train; and the second permanent magnet array is distributed along a transverse direction of the maglev train; and the bogie is provided on the maglev train; the two lifting-lowering devices are provided below the bogie; the first permanent magnet array is connected to a bottom of the bogie by one of the two lifting-lowering devices; and the second permanent magnet array is connected to the bottom of the bogie by the other of the two lifting-lowering devices.

2. The permanent magnet electrodynamic suspension system of claim 1, wherein each of the two lifting-lowering devices comprises an outer frame and a screw rod connector, and the outer frame is connected to the bottom of the bogie by the screw rod connector.

3. The permanent magnet electrodynamic suspension system of claim 1, further comprising:
a conductor plate;
a stator coil; and
an insulation base;
wherein the conductor plate is provided below the bogie; the stator coil is provided under the conductor plate; the stator coil is provided on the insulation base; and the insulation base is provided on the roadbed.

4. The permanent magnet electrodynamic suspension system of claim 1, wherein an end face of the first permanent magnet array close to the conductor track is located at the same height as an end face of the second permanent magnet array close to the conductor track.

5. A guidance method for a permanent magnet electrodynamic suspension system, the permanent magnet electrodynamic suspension system comprising:
a conductor track; and
a suspension and guidance device;
wherein the conductor track is laid on a roadbed; and the suspension and guidance device is arranged above the conductor track;
the suspension and guidance device comprises a first permanent magnet array and a second permanent magnet array; the first permanent magnet array and the second permanent magnet array are the same in magnetization direction arrangement and the first permanent magnet array and the second permanent magnet array are arranged perpendicular to each other;
the first permanent magnet array comprises at least one first permanent magnet arranged side by side along a transverse direction; the first permanent magnet array has a bar-shaped structure; the first permanent magnet array is disposed parallel to an extension direction of the conductor track; and a magnetic field change direction of the first permanent magnet array is parallel to a travel direction of a magnetic levitation (maglev) train; and the second permanent magnet array comprises at least one second permanent magnet arranged side by side along a vertical direction; the second permanent magnet array has a bar-shaped structure; the second permanent magnet array is arranged perpendicular to the extension direction of the conductor track; a magnetic field change direction of the second permanent magnet array is perpendicular to the travel direction of the maglev train; and the second permanent magnet array is distributed along a transverse direction of the maglev train;

the guidance method comprising:
(a) receiving a first control command configured to start and accelerate the maglev train in a standstill state;
(b) monitoring a power supply condition and an operation status of the maglev train in real time, wherein the power supply condition comprises an actual power supply frequency and a power supply slip rate, and the operation status comprises an operation speed and a position of the maglev train;
(c) according to the power supply condition and the operation status, calculating an optimal power supply frequency of the maglev train, an optimal power supply slip rate corresponding to the optimal power supply frequency, and an acceleration required by the maglev train;
(d) according to the operation speed of the maglev train, adjusting the optimal power supply frequency, the optimal power supply slip rate, and the acceleration;
(e) sending a second control command, wherein the second control command is configured to be executed to control the maglev train to reach a preset speed according to the optimal power supply frequency, the optimal power supply slip rate and the acceleration after adjusted;
(f) sending a third control command configured to be executed to send a switching signal to control the two lifting-lowering devices to start when the maglev train reaches a suspension speed;
(g) collecting a suspension height of the maglev train in real time, and adjusting the suspension height to a preset suspension height;
(h) receiving a fourth control command, wherein the fourth control command is configured to be executed to control the train to travel at the preset speed; and
(i) collecting a y-direction offset speed of the maglev train and a height of the second permanent magnet array in real time;
wherein when the maglev train is about to enter a suspension state, the switching signal is sent to control the two lifting-lowering devices to start to adjust a guidance height to a preset guidance height, so as to allow the maglev train to stably enter the suspension state; during operation in the suspension state, it is determined whether the y-direction offset speed exceeds a threshold when y-direction offset occurs; if yes, the switching signal is sent to control the two lifting-lowering devices to start to reduce the guiding height; otherwise, the y-direction offset speed of the maglev train is continuously monitored in real time.

6. The guidance method of claim 5, further comprising:
(j) receiving a fifth control command, wherein the fifth control command is configured to be executed to send the switching signal to the two lifting-lowering devices, so as to lift the first permanent magnet array and the second permanent magnet array to a preset braking height;
(k) according to the fifth control command, collecting a braking deceleration of the maglev train in real time;
(l) according to the braking deceleration, calculating a braking distance required by the maglev train;
(m) obtaining an information, wherein the information comprises an actual distance between the maglev train and a platform; and
(n) comparing the actual distance with the braking distance to determine whether a braking requirement is satisfied; if the braking distance is less than the actual distance, maintaining the maglev train in a current operation status; and if the braking distance is greater than the actual distance, adjusting a current supplied to the maglev train until the braking requirement is met.

7. The guidance method of claim 5, further comprising:
receiving a fifth control command configured to be executed to brake the maglev train;
sending a sixth control command, wherein the sixth control command is configured to be executed to send the switching signal to the first permanent magnet array and the second permanent magnet array, so that the first permanent magnet array and the second permanent magnet array rise to the preset braking height;
according to the braking deceleration, calculating the braking distance required by the maglev train;
obtaining an information, wherein the information comprises an actual distance between the maglev train and the platform; and
comparing the actual distance with the braking distance to determine whether a braking requirement is satisfied; if the braking distance is less than the actual distance, maintaining the maglev train in a current operation state; and if the braking distance is greater than the actual distance, adjusting a current supplied to the maglev train until the braking requirement is met.

* * * * *